J. B. GATHRIGHT.
AUTOMOBILE LICENSE TAG.
APPLICATION FILED JULY 14, 1914.
1,269,923.   Patented June 18, 1918.
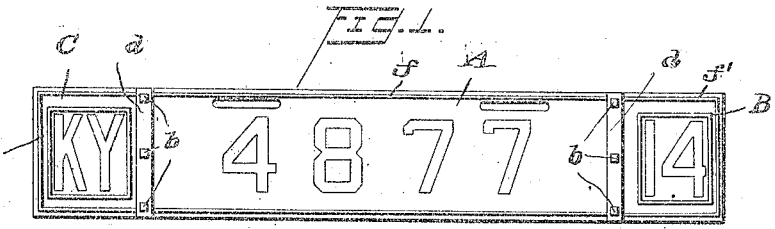
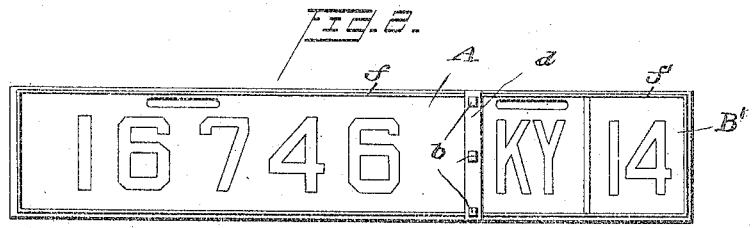
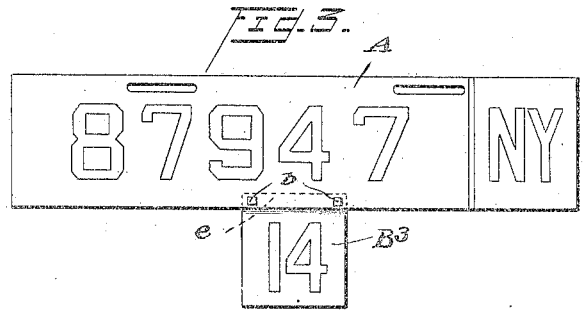
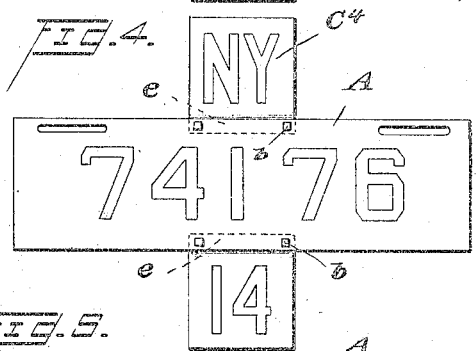
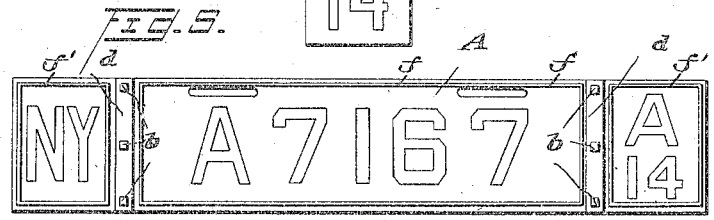
Witnesses
Harold Strauss
J. M. Fowler Jr.
Inventor
Josiah B. Gathright
By C. J. Stockman
Attorney

UNITED STATES PATENT OFFICE.

JOSIAH B. GATHRIGHT, OF LOUISVILLE, KENTUCKY.

AUTOMOBILE LICENSE-TAG.

1,269,923. Specification of Letters Patent. Patented June 18, 1918.

Application filed July 14, 1914. Serial No. 850,921.

*To all whom it may concern:*

Be it known that I, JOSIAH B. GATHRIGHT, a citizen of the United States, residing at Louisville, in the county of Jefferson and State of Kentucky, have invented new and useful Improvements in Automobile License-Tags, of which the following is a specification.

This invention has relation to a license plate for automobiles and other vehicles produced with a view of reducing the expense which is now incurred in the furnishing of an entirely new tag for each year or other license period while at the same time it shall graphically indicate the period during which it is effective.

I have produced, and herein disclose, various exemplary embodiments of my invention, in each of which the license plate is formed in separable but rigidly connected members, one of which carries the number appropriated to the vehicle, the said number being permanently affixed to said member, and the other of which members carries the data indicating the period for which license has been paid. The member carrying the numbers appropriated to the vehicle is intended to be permanently applied to the vehicle,—that is to say, is intended to be unchanged during the lifetime of the vehicle or while it remains the property of the same person, while the member of the plate which contains data indicating the period, is removable and is to be changed each license period. Hence it becomes unnecessary by the use of this license plate to furnish a new tag each license period, and, moreover, the expense of printing, for the use of policemen, constables and other persons, a new list of licensed owners each year—or other license period—with the numbers of their licenses, is avoided.

The fundamental purposes of the present invention will be defeated or not fully carried out unless the tag be of simple and inexpensive construction, and for this reason I have formed it mainly of an integral plate having the number appropriated to the vehicle permanently applied thereto and I secure the removable members directly rigidly and removably to said plate, by bolts, screws or other appropriate fastening elements.

The tag should also contain data showing the State which issues it and this part may form a permanent or removable member thereof, as desired.

In cases wherein the license fee is graded according to the class or the power of the vehicle for which it is issued, it is preferred to have the tag not only indicate the period during which it is effective but further indicate the class for which it is intended. In such case the number of the plate, according to my present invention, is associated with an appropriate letter or other index character indicating the class and this index character may also appear on the removable member of the plate. This contributes to a reduction of the expense as the numbers may be repeated in the various classes so that they will not run into as many figures as the aggregate number of vehicles licensed by the issuing source.

Having thus in a general way set forth the fundamental purposes of, and the advantages accruing from the use of the present invention, I will now set forth the particular constructions which I have illustrated to exemplify the invention, reference being had to the accompanying drawings, wherein:

Figure 1 is a plan view of a license plate having removable members at its opposite ends, one of the removable members containing the State designation and the other the year of issue.

Fig. 2 is a like view wherein the removable member at one end of the plate contains both the State designation and the year of issue.

Fig. 3 is a plan view illustrating a form in which the State designation is at one end of, and integral with, the number member and the year is separate from and removably attached to the former member between the ends of the latter.

Fig. 4 is a like view in which the State and year designations are removably secured to the number member of the plate between the ends of the latter.

Fig. 5 is a like view of a form which may be usefully employed in cases wherein the licenses are issued according to the class or grades of the vehicles to which they are to be applied.

In all the figures of the drawing the member of the plate which is appropriated to the number of the license is designated A, this member being of the same construction throughout. It is intended to be mounted in any appropriate manner upon the vehicle for which it has been issued. It is preferably either stamped or cast from appropriate metal and has the number of the license permanently formed thereon, by stamping or casting said number on the plate, by painting the number thereon, or by both stamping or casting and painting. Referring to Fig. 1, B designates a removable member of the plate containing a designation indicative of the year of issue and C designates a second removable member of the plate containing data indicative of the State which issued the license. The removable members B and C are preferably arranged at the ends of the plate B and are secured to the latter by bolts $b$ or other appropriate fastening elements.

In the form shown in Fig. 2 the data indicative of the State issuing the license and the year during which it is effective are fixed to a common removable member marked B' which is bolted or otherwise suitably secured to one end of the number member of the plate.

In the form shown in Fig. 3 the number member A of the plate has at one end and integral therewith a member containing data indicative of the State which issued the license, and a separate member, marked $B^3$, is removably bolted or otherwise suitably fastened to the number plate intermediate the length of the latter. Instead of arranging the State designation at the end of and as an integral part of the number member of the plate, it may be mounted on the number plate removably, between the ends of the latter, as shown at $C^4$ (Fig. 4) and in such case it may form either a part of the member which contains the year or be a separate member. The arrangements shown in Figs. 3 and 4 are particularly advantageous for use in States where the numbers run so high that a plate containing the numbers and also containing data indicative of the State which issued the licenses and the period during which it is effective will be unduly long if the latter data be at the end of the number: it being understood that by arranging either the data indicative of the State or the data indicative of the year, or both such datas, at a place intermediate the length of the member containing the number, the length of the plate is correspondingly reduced.

The desirability of keeping the length of the plate within as short limit as possible also is considered in the production of the plate shown in Fig. 5, in which, however, the members containing data which indicate the State of issue and year during which the license is effective are mounted at the ends of the member which contains the number of the license: but it will be noted that the number is associated with a particular letter which indicates the class of vehicles for which the license has been issued and that this letter appears also on the member which contains the data indicating the year during which the license is effective.

It will be noted that in all cases the member of the plate which contains the year designation is removable from the member of the plate which contains the number and is directly secured to the latter in the simplest possible way. It will thus be apparent that the use of this license plate will reduce the expense of issuing licenses to a minimum, for the reason that the plate costs little if any more than the plate now customarily adopted and at the same time avoids the necessity of issuing a new license plate each year, it being necessary only to issue a member containing the new year designation and to secure this member to the number member of the plate in lieu of the expired year-member. It will be noted that practically the entire expense connected with these plates is in the production of the member which contains the number, each plate having a different number from every other plate and hence being very expensive in the aggregate: while the year designations all contain the same data as do also the members containing designation for each particular State. The plate further has an important advantage due to the fact that the number is retained during the entire period of a single ownership of the vehicle to which it has been appropriated and hence becomes more firmly connected with that vehicle than is the case where the number changes frequently, and avoids the necessity of issuing each year an entirely new list of owners with their changed numbers.

It will of course be understood that the removable members in practice will preferably be colored in such a way as further to indicate the year of issue, the color being changed each year and preferably being a color which contrasts with that of the main body of the plate containing the number.

It will be noted that in the several figures of the drawing, the removable members are arranged with edges or portions abutting directly against an edge of the main member A and an offset portion $d$ or $e$ is formed adjacent to the abutting edges and carries the screws, bolts or other fastening elements, by which the members are secured to each other. The offset portion forms a flange which overlies or underlies the edge of the adjacent member and through which the fastening elements extend, it being understood that the fastening elements also extend through the edges of the adjacent members. The offset portions $d$ or $e$ may be on either the main plate or the removable members, as desired. The plate A and the removable members are preferably formed with creased edges $f$ and $f'$, respectively, to ornament and stiffen them.

Having now described the invention what I believe to be new and desire to secure by Letters Patent is:

1. A license plate comprising a main member having permanently thereon and integral therewith the figures of the license number, and a second member having permanently thereon and integral therewith indicia of the year of the license, the said second member being removably and rigidly secured directly to an end of the main member and constituting a prolongation thereof.

2. A license plate comprising a main member having permanently thereon and integral therewith the figures of the license number, and a supplemental member having permanently thereon and integral therewith indicia of the year of the license, an edge of one of said members overlapping an edge of the other member and said edges being rigidly but removably secured together.

3. A license plate comprising a main member having permanently thereon and integral therewith the figures of the license number and a character indicating the class of the vehicle, and a supplemental member having permanently thereon and integral therewith indicia which include a character corresponding to the one on the main member for indicating the class of the vehicle, the said supplemental member being removably and rigidly secured to an edge of the main member.

4. A license plate comprising a main member having permanently thereon and integral therewith the figures of the license number and a character indicating the class of the vehicle, and supplemental members having permanently thereon and integral therewith indicia which include a character corresponding with the one on the main member for indicating the class of the vehicle, and characters indicating the year and territory of the license, the said supplemental members being removably and rigidly secured to edge of the main member.

5. A license plate for motor vehicles comprising a main member having permanently thereon and integral therewith, the several figures necessary to constitute a license number, a second member having permanently thereon and integral therewith indicia of the year of the license, said second member being removably and rigidly secured directly to an edge of the main member.

6. A license plate for automobiles comprising a main member with numerals thereon indicating the license number of the machine and a letter of the alphabet adjacent to said numerals to indicate the license class of the machine, and a member detachably secured thereto, having thereon indicia relating to the year of issue and the territory affected by the license.

In testimony whereof I have hereunto set my hand in presence of two subscribing witnesses.

JOSIAH B. GATHRIGHT.

Witnesses:
E. S. FOOTE,
JESSE N. GATHRIGHT.